(12) United States Patent
Pastrick et al.

(10) Patent No.: US 8,302,288 B2
(45) Date of Patent: Nov. 6, 2012

(54) SYSTEM AND METHOD FOR ASSEMBLING A CLOSURE

(75) Inventors: Richard Daniel Pastrick, Roseville, MI (US); Anthony Peter Young, Ypsilanti Township, MI (US); Paul Temple, Northville, MI (US)

(73) Assignee: Ford Motor Company, Dearborn, MI (US)

( * ) Notice: Subject to any disclaimer, the term of this patent is extended or adjusted under 35 U.S.C. 154(b) by 1041 days.

(21) Appl. No.: 12/145,661

(22) Filed: Jun. 25, 2008

(65) Prior Publication Data

US 2009/0322120 A1 Dec. 31, 2009

(51) Int. Cl.
*B23P 21/00* (2006.01)
*B23Q 15/00* (2006.01)

(52) U.S. Cl. .............................. 29/714; 29/709; 29/897.2

(58) Field of Classification Search ................. 29/897.2, 29/714, 709, 469; 296/146.11
See application file for complete search history.

(56) References Cited

U.S. PATENT DOCUMENTS

| | | | | |
|---|---|---|---|---|
| 4,589,199 A | * | 5/1986 | Ohtaki et al. | 29/714 |
| 4,736,515 A | * | 4/1988 | Catena | 29/714 |
| 4,907,331 A | * | 3/1990 | Kaibuki et al. | 29/213.1 |
| 5,181,307 A | * | 1/1993 | Kitahama et al. | 29/434 |
| 6,122,813 A | | 9/2000 | Roy et al. | |
| 6,918,167 B2 | | 7/2005 | Hughes | |
| 6,954,980 B2 | | 10/2005 | Song | |
| 7,036,210 B2 | * | 5/2006 | Jung | 29/714 |
| 2006/0261533 A1 | | 11/2006 | Freeland | |

OTHER PUBLICATIONS

U.S. Appl. No. 12/017,088 (Sherrill et al.).

* cited by examiner

*Primary Examiner* — Alexander P Taousakis
(74) *Attorney, Agent, or Firm* — Raymond L. Coppiellie; Brooks Kushman P.C.

(57) ABSTRACT

A system and method for assembling a closure for a vehicle. The system includes first, second and third closure manipulators adapted to engage different areas of the closure, a first hinge manipulator configured to receive and fasten a first hinge to the closure, and a nab pin manipulator configured to position and secure a nab pin in a fixed position relative to the door and the hinge.

10 Claims, 5 Drawing Sheets

SYSTEM AND METHOD FOR ASSEMBLING A CLOSURE

BACKGROUND OF THE INVENTION

Field of the Invention

The present invention relates to a system and a method for assembling one or more types of closures for a vehicle.

SUMMARY OF THE INVENTION

In at least one embodiment, a system for assembling a closure for a vehicle is provided. The system comprises first, second and third closure manipulators adapted to engage different areas of the closure, a first hinge manipulator configured to receive and fasten a first hinge to the closure, and a nab pin manipulator configured to position and secure a nab pin in a fixed position.

In at least one other embodiment, a method for assembling a closure for a vehicle is provided. The method includes positioning and grasping a closure with first and second closure manipulators, grasping the closure with a third closure manipulator, attaching a first hinge to the closure with a first hinge manipulator, and positioning and tightening a nab pin associated with the first hinge with a nab pin manipulator after attaching the first hinge.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

Figure 1:
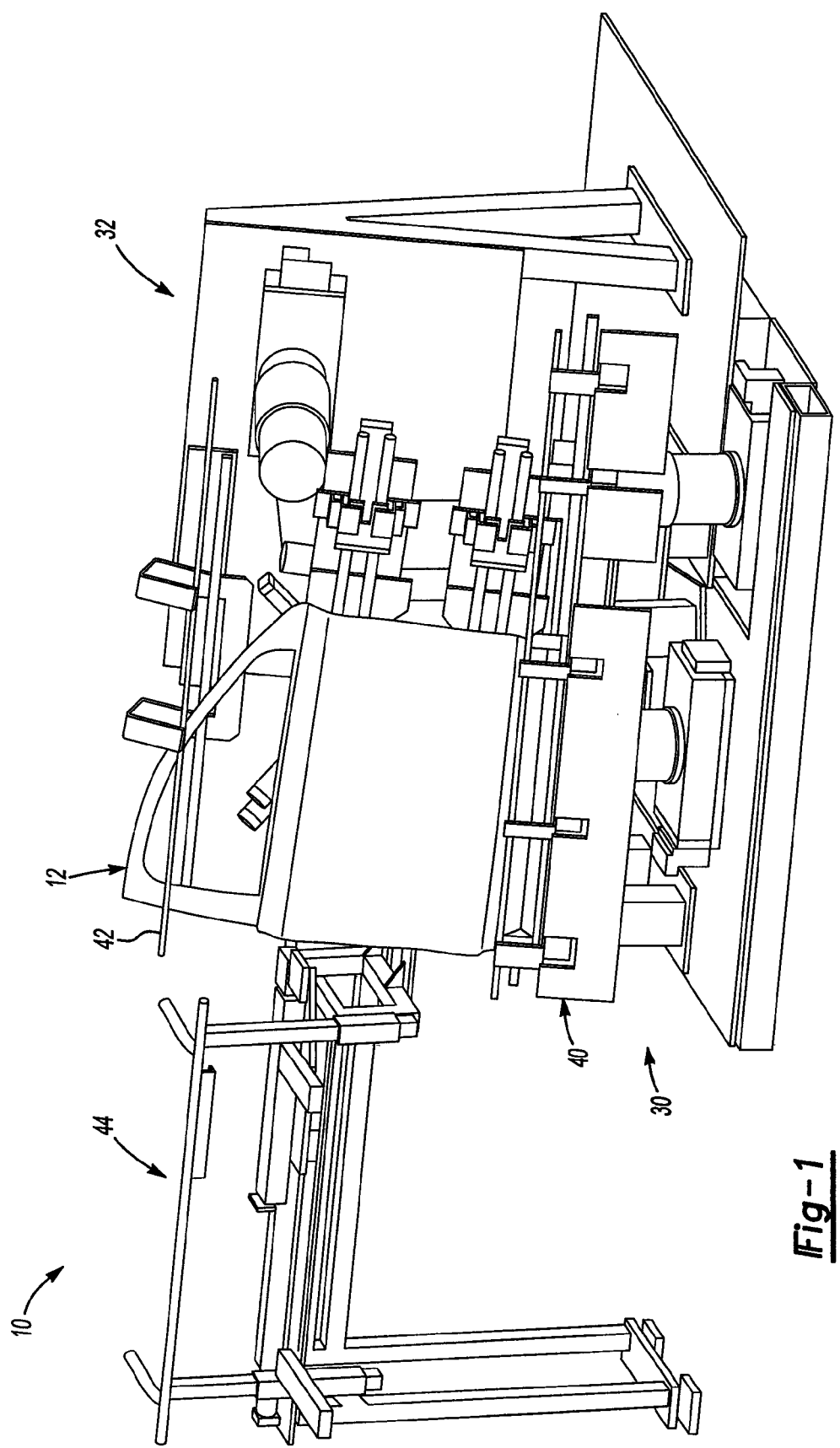
FIG. 1 is a perspective view of a system for assembling a closure.

Referring to FIG. 1, a system 10 for assembling a closure 12 is shown. The system 10 may be employed in the assembly of a closure for a vehicle, such as a motor vehicle like a car or truck.

The closure 12 may have any suitable configuration. For example, the closure 12 may be a vehicle component or subassembly, such as a door, hood, hatchback, trunk or decklid, that may be adapted to be moveably disposed on a vehicle to selectively cover an opening, such as a vehicle body structure opening. In FIG. 1, a representative closure is shown that is configured as a front vehicle door.

Figure 2:
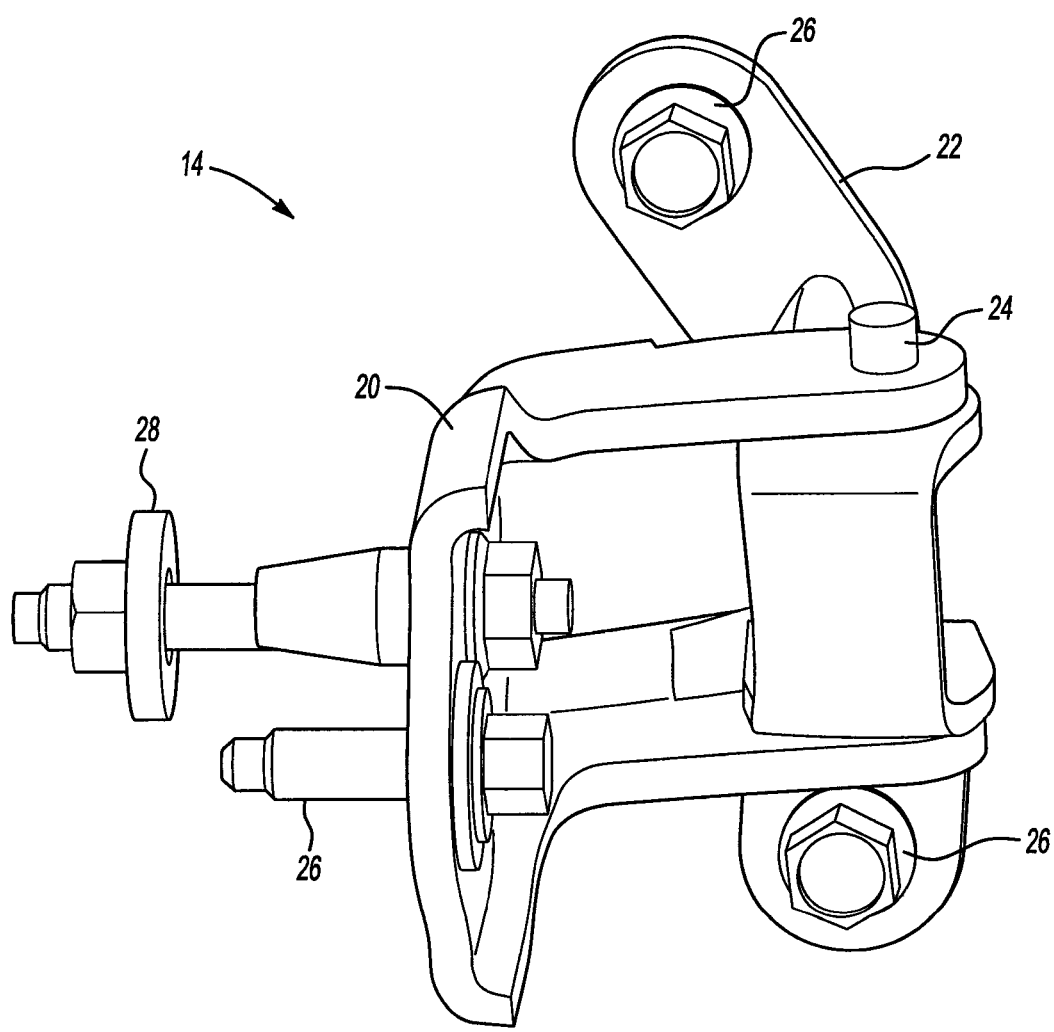
FIG. 2 is a perspective view of a hinge for a closure.

Referring to FIG. 2, the closure 12 may include one or more hinges 14 that facilitate mounting on the vehicle and permit the closure 12 to be moved between an open position and a closed position. In the exemplary embodiment discussed below, two hinges are provided.

The hinges 14 may have any suitable configuration. For example, the hinge 14 may include one or more mounting plates 20, 22 and may be connected with a hinge pin 24 in a manner known by those skilled in the art. The mounting plates 20, 22 may include one or more holes for receiving a fastener 26, such as a threaded or unthreaded fastener, as will be discussed in more detail below. If a plurality of hinges are provided, they may have the same or different configurations.

A nab pin 28 may be provided with a hinge 14. In at least one embodiment, the nab pin 28 may be configured as an adjustable pin that extends from the hinge 14. The nab pin 28 may be loosely attached to the hinge 14 before mounting on the closure 12. As will be discussed in more detail below, the nab pin 28 may be positioned and secured in a fixed position relative to the hinge 14 and/or closure 12 subsequently or concurrently with assembly of the hinge 14 to the closure 12. As such, the nab pin 28 may be used as a datum surface to trend set a closure to a specific geometry and facilitate locating on the vehicle.

Figure 3:
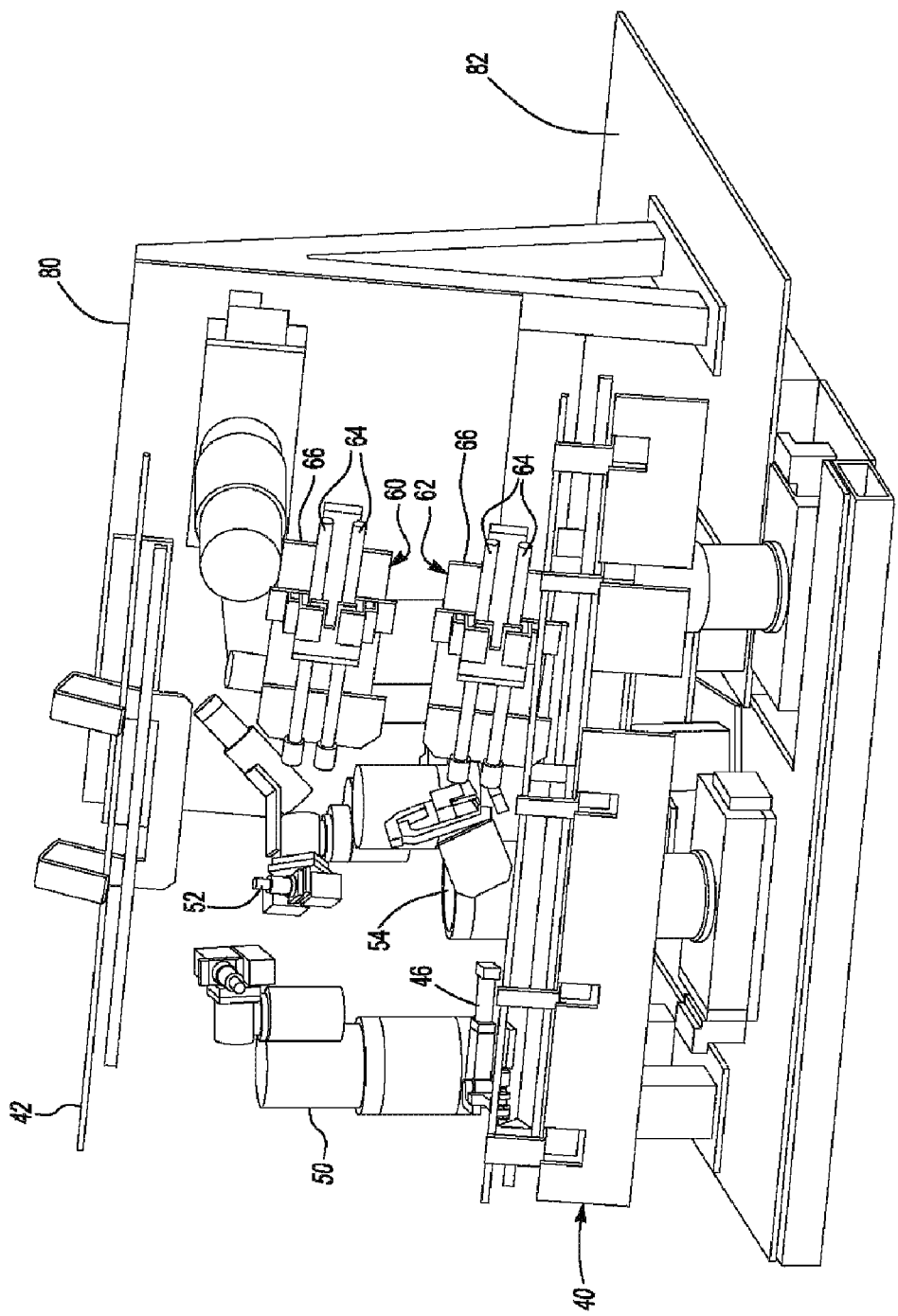
FIG. 3 is a perspective view of the system of FIG. 1 without the closure.
Figure 4:
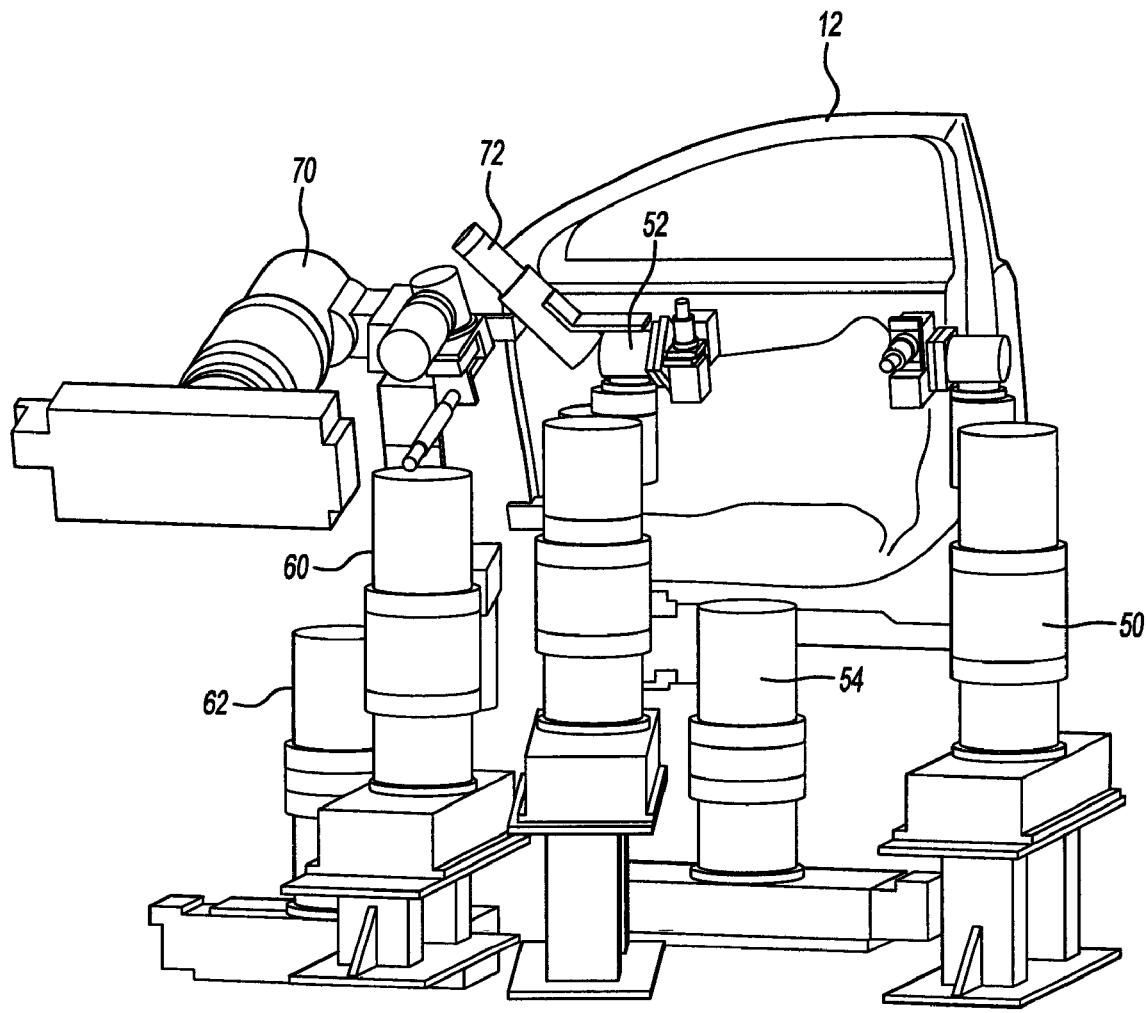
FIG. 4 is a fragmentary perspective view of the system.

Referring to FIGS. 1, 3 and 4, the system 10 will be described in more detail. The system 10 may include a material handling subsystem 30 and a reconfigurable fixturing subsystem 32.

The material handling subsystem 30 may be adapted to transport a closure 12 to and/or from the reconfigurable fixturing subsystem 32. In the embodiment shown, the material handling subsystem 30 includes a conveyor 40, a guide rail 42, and a shuttle 44.

The conveyor 40 may be configured to transport a closure 12 to the reconfigurable fixturing subsystem 32. The conveyor 40 and guide rail 42 may cooperate to help support the closure 12. For instance, a lower portion or bottom surface of the closure 12 may be positioned on the conveyor 40 while an upper portion of the closure 12 may be move along and/or be supported by the guide rail 42 as the closure 12 is moved. In the embodiment shown in FIG. 1, the conveyor 40 and guide rail 42 are offset from a vertical plane to allow the closure 12 to rest against the guide rail 42 while enabling support by the conveyor 40. In addition, the guide rail 42 may be offset from the conveyor 40 to accommodate the shape or curvature of the closure 12. Optionally, the guide rail 42 may be independently movable relative to the conveyor 40 to provide flexibility to accommodate different closure configurations. In addition, a fixed or moveable bumper 46 may be provided to help stop and generally locate the closure 12 during operation of the conveyor 40.

The shuttle 44, if provided, may facilitate transport of the closure 12 from the reconfigurable fixturing subsystem 32. The shuttle 44 may have any suitable configuration that is compatible with the closure or closures may be processed by the system 10. For example, the shuttle 44 may be configured to receive and move the closure 12 to a vehicle assembly line where the closure 12 may be assembled to a vehicle body structure.

The reconfigurable fixturing subsystem 32 may include a plurality of manipulators, such as robotic manipulators, that may be independently positioned relative to each other. The manipulators may be adjustable or moveable in multiple directions and along or about multiple axes, thereby providing multiple degrees of freedom. The manipulators and independent positioning may help provide manufacturing flexibility. For instance, one or more manipulators may be selectively reconfigured or repositioned to accommodate different closures or closure configurations. Moreover, these closures may be associated with different vehicle configurations that may be built on a common assembly line. As such, a reconfigurable fixturing subsystem 32 may reduce cost, complexity, setup time, labor costs, and/or floorspace requirements as compared to a fixture that is dedicated to a particular closure geometry.

Referring to FIGS. 3 and 4, the manipulators may be categorized as closure positioning units, hinge setting units, and a nab pin setting unit.

The closure positioning units may include a first manipulator 50, a second manipulator 52, and a third manipulator 54. The first and second manipulators 50, 52 may be adapted to grasp and position the closure 12. For instance, the first and second manipulators 50, 52 may move the closure 12 away from the conveyor 40 to an assembly position in which the hinges 14 may be assembled. In at least one embodiment, the first and second manipulators 50, 52 may have generally similar configurations and may be provided with different end effector tools or pin packages. For instance, the first and second manipulators 50, 52 may include a two-way pin and a four-way pin, respectively, that are adapted to grasp different points or openings on the closure 12 while providing orientation in different directions. A manipulator such as the second manipulator 52 may have an end that is configured to rotate to permit the manipulator to select a desired pin package from a magazine.

The third manipulator 54 may grasp or clamp a lower portion of the closure 12. For instance, the third manipulator 54 may be generally located below the first and second manipulators 50, 52 and may clamp a bottom of the closure 12 to help keep the closure 12 from rocking or moving when elevated from the conveyor 40.

The hinge setting units may include a plurality of manipulators, such as first and second hinge manipulators 60, 62. The hinge manipulators 60, 62 may have the same or different configurations. For instance, the hinge manipulators 60, 62 may be adapted to each receive a hinge and one or more fasteners. For example, each manipulator 60, 62 may have a slot or opening that receives a hinge 14. In addition, the hinge manipulators 60, 62 may include one or more nutrunners 64, such as DC nutrunners, that are adapted to drive a fastener through an associated hole in the hinge and into the closure 12 to allow the fastener to engage the hinge 14 to the closure 12. The nutrunners 64 of each hinge manipulator 60, 62 may be fixedly positioned or moveably positionable relative to each other. In the embodiment shown, the nutrunners 64 are fixedly mounted on a support plate 66 that may be coupled to an associated hinge manipulator 60, 62. Alternatively, the hinge manipulators may be moved relative to each other to accommodate closures with different distances between the hinges.

The nab pin setting unit may include a nab pin manipulator 70 that includes a nutrunner 72 that is adapted to engage the nab pin 28 on a hinge 14. For example, the nutrunner 72 may include a socket that is adapted to receive the nab pin 28 and tighten the nab pin 28 when rotated. The nab pin manipulator 70 may be adapted to maneuver around one or more other manipulators, such as the hinge manipulators 60, 62 to engage the nab pin 28 without interfering with mounting of a hinge 14 to the closure 12. In addition, the nab pin manipulator 70 may be disposed on a platform 80 that is separate from a platform 82 that receives other manipulators, such as the closure manipulators 50, 52, 54 and/or hinge manipulators 60, 62. In the embodiment shown, the platform 80 is generally disposed on and at an angle relative to platform 82.

Figure 5:
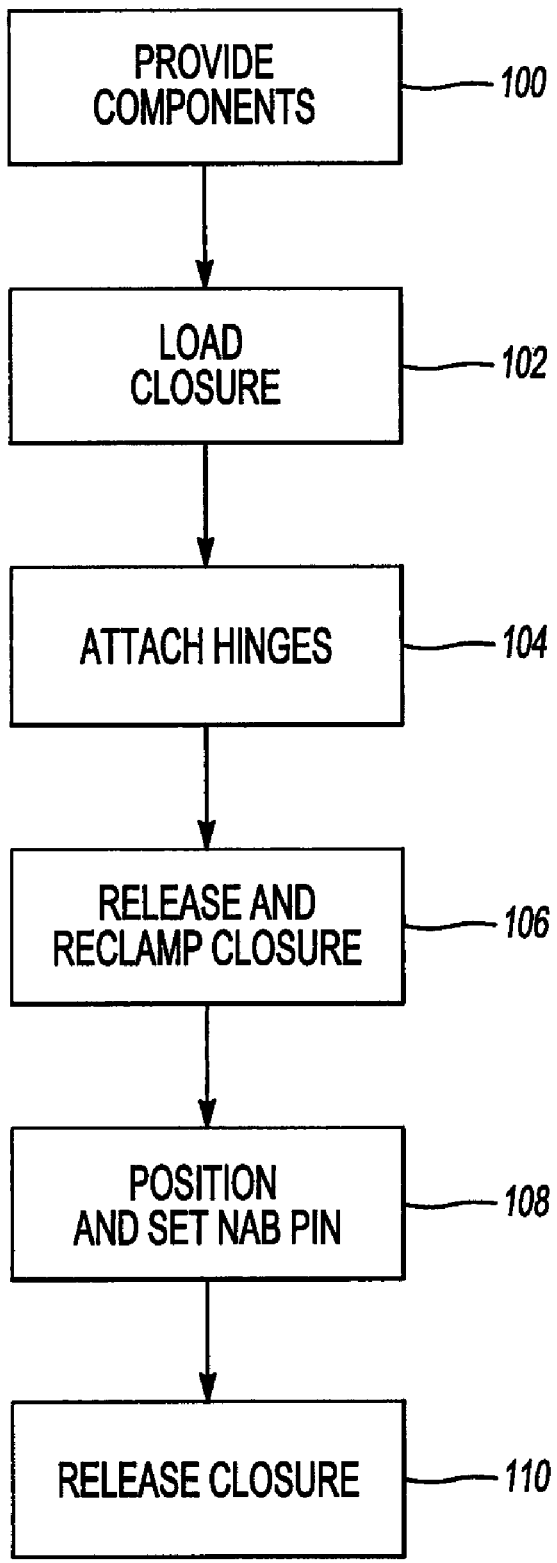
FIG. 5 is an exemplary flowchart of a method of assembling a closure.

Referring to FIG. 5, a flowchart of a method of assembling a closure is shown.

At 100, the components for assembly may be provided. For example, the closure may be provided to the material handling subsystem and one or more hinges and fasteners may be manually or automatically provided to the hinge manipulators. In addition, the material handling subsystem may transport the closure to the reconfigurable fixture subsystem.

At 102, the closure is loaded into the fixture subsystem. Loading the fixture may include grasping the closure with the first and second closure manipulators, moving the closure away from the conveyor, and grasping the closure with the third manipulator.

At 104, one or more hinges are attached to the closure. The hinges may be attached by positioning the first and second hinge manipulators proximate the closure, driving one or more fasteners into a hinge and the closure with one or more associated nutrunners, and disengaging the hinge manipulators from the closure.

At 106, the closure may be released and reclamped by one or more manipulators. For instance, the first and second closure manipulators may unclamp from the closure to reduce residual stress that may have resulted from hinge attachment and then reclamp to the closure to help improve positioning accuracy.

At 108, the nab pin may be positioned and set in a fixed position. The nab pin may be set or tightened with the nab pin unit as previously described. Moreover, nab pin positioning relative to the closure may be improved due to the reduction of residual stress described above that may otherwise result in distortion or warping of the closure after release from the system.

At 110, the closure may be released from the system. For instance, the hinge, nab pin, and third closure manipulators may be retracted and the first and second closure manipulators may lower and release the closure onto the conveyor or move the closure to a position that enables engagement with the shuttle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A system for assembling a closure for a vehicle, comprising:
   a first manipulator that engages the closure;
   a first hinge manipulator that fastens a first hinge to the closure, the first hinge having a hinge pin that pivotally couples first and second mounting plates and a nab pin positioned on the first mounting plate and spaced apart from the hinge pin; and
   a nab pin manipulator having a nutrunner that is adapted to engage the nab pin to fixedly position the nab pin.

2. The system of claim 1 further comprising a second hinge manipulator configured to receive and fasten a second hinge to the closure, the second hinge manipulator being independently positionable relative to the first hinge manipulator.

3. The system of claim 2 further comprising second and third closure manipulators, wherein the first, second, and third closure manipulators, the nab pin manipulator, and the first and second hinge manipulators are all spaced apart from each other to permit independent positioning.

4. The system of claim 2 wherein the first and second hinge manipulators each further comprise first and second nutrunners adapted to drive fasteners to secure the first and second hinges to the closure.

5. A system for assembling a closure for a vehicle, the system comprising:

first, second, and third closure manipulators that engage different surfaces of the closure;
first and second hinge manipulators that receive and fasten first and second hinges to the closure, respectively; and
a nab pin manipulator having a nutrunner that is adapted to engage a nab pin to position and secure the nab pin in a fixed position relative to the closure and the first hinge;
wherein the first hinge includes a first mounting plate that engages the closure, a second mounting plate, a hinge pin that pivotally couples the first and second mounting plates, and a nab pin that is positioned on the first mounting plate and spaced apart from the hinge pin.

6. The system of claim 5 further comprising a conveyor for transporting the closure, wherein the first and second closure manipulators engage and move the closure from the conveyor before the third closure manipulator engages the closure.

7. The system of claim 6 further comprising a guide track for receiving the closure, the guide track and the nab pin manipulator being mounted on a first platform that is mounted at an angle with respect to a second platform that is disposed below the conveyor.

8. The system of claim 5 wherein the third closure manipulator engages a bottom surface of the closure to inhibit rotation of the closure.

9. The system of claim 5 wherein the nab pin manipulator positions and secures the nab pin when the first hinge is secured to the closure with a fastener.

10. The system of claim 5 wherein the first and second closure manipulators release the closure to reduce residual stress in the closure before the nab pin is positioned.

* * * * *